Reissued Feb. 16, 1937 Re. 20,271

UNITED STATES PATENT OFFICE 20,271

FIBROUS SHEET MATERIAL

Stephen B. Neiley, Winchester, Mass., assignor to Dewey and Almy Chemical Company, North Cambridge, Mass., a corporation of Massachusetts No Drawing. Original No. 1,978,385, dated October 23, 1934. Serial No. 668,663, April 29, 1933. Application for reissue December 21, 1934, Serial No. 758,650

13 Claims. (Cl. 92—21)

This invention relates to rubber-impregnated fibrous sheet material such as is used in the manufacture of artificial leather, inner soles, etc.; and it generally comprises combining a long-fibered furnish derived from textile fiber with a short-fibered substantially unhydrated furnish which is also derived from textile fiber, forming the mixture into an absorptive sheet, and impregnating the sheet with a liquid rubber saturant, a process and a product thereof, all as more fully hereinafter described and claimed.

Rubber-impregnated sheet material of the general type to which this invention relates is commonly made by saturating absorptive paper with a liquid rubber impregnant such as a latex composition or a solution of rubber in a suitable solvent. Absorptive paper prepared according to the usual paper-making procedures is ill suited, however, for such impregnation purposes, especially where a latex saturant is employed. It lacks either the necessary permeability and absorptivity or the strength essential in the impregnation process and desired in the finished product. Furthermore, it leads to a rubber-permeated fibrous sheet which is "dead" or lacks the springiness and resiliency that characterize the product of the present invention.

An object of this invention is to provide rubber-impregnated fibrous sheet material of greater strength than has heretofore been possible. Another object is to provide a fibrous felt which will not only afford a finished impregnated sheet of superior strength but which will be at once cheaper to produce, more easily permeable by saturants—especially latex compositions, more highly absorptive, and stronger in the wet condition than the fibrous felts which have been prepared heretofore. Still another object is to provide a rubber-permeated fibrous sheet which will have extraordinary flexibility, resiliency, and springiness or "life." Other objects and advantages of the invention will become apparent with its more detailed description or will be obvious to those skilled in the art.

The science of making paper depends upon a hydration and fibrillation which occurs when paper-making fiber is beaten in water. The hydration manifests itself in the slimy appearance or unctuous feel of a thoroughly beaten slurry and results in a swelling of the fiber surfaces to form a gel or almost glue-like substance which serves to cement the fibers together when they are made into paper. The fibrillation manifests itself by a fraying of the surfaces and ends of the fibers in a manner to produce minute tendrils or fibrillae which serve to felt or lock the fibers together when they are subjected to the paper-making process. The more the fibers of a slurry have been hydrated, the stronger is the paper made therefrom; but, correspondingly, the resulting paper is very stiff and dense and not at all suited for impregnation with liquid rubber compositions. When, therefore, it is desired to make according to existing procedures a paper suitable for impregnation, it is necessary greatly to minimize the amount of hydration which occurs; but at the same time it is also essential to reduce the furnish to a short fiber length, for otherwise a harsh and uneven sheet results. For these purposes a slurry of fiber is generally subjected to a very rapid cutting action in a paper beater, or, in the language of the trade, to a "fast beating tackle". In this manner is made the absorptive sheet material of commerce of which ordinary blotting paper is an excellent example. When such material is impregnated with a liquid rubber saturant, however, it is extremely weak in the wet condition and leads to a finished rubber-impregnated sheet which lacks not only strength but also resilience, springiness, or life. Furthermore, the absorptive paper which has been available heretofore is particularly disadvantageous when latex saturants are used because it either is not readily pervious to them or necessitates especial precautions to prevent tearing the sheet when in the wet impregnated condition.

I have discovered that rubber-impregnated fibrous sheet material of improved strength and resilience, springiness, or life may be made by impregnating specially prepared felt of the type hereinafter described with a liquid rubber saturant. Whereas this fibrous felt is well adapted for saturation with either the usual solvent or latex rubber impregnating compounds, it possesses special process advantages for use with latex compositions which are less prone thoroughly to penetrate the interstices of a close-textured fibrous material.

The fibrous felt which I employ for saturation is made by combining two types of furnish, one designed to impart strength to the sheet in both the unimpregnated and rubberized conditions, and the other to impart desirable absorptivity and bulk; and the combination, when the fibers thereof are bonded with rubber, yields the resilience or springiness which is a feature of products made in accordance herewith. The first constituent is characterized by unusual fiber length. For this purpose I require textile fibers such as cotton, wool, ramie, jute, etc., which are capable of yielding slurries in which the fibers have lengths of the order of one quarter to three eighths of an inch. The so-called long-fibered paper-making furnishes prepared from wood pulp and the like are not serviceable for my purpose because they either possess too short a fiber length or yield, when subjected to the general process of this invention, rubber-impregnated products which are stiff or "dead". A furnish which is very satisfactory for present purposes, and which I prefer because it is cheap, may be prepared by subjecting cotton shearings to a slow beating action, or a "slow beating tackle", for a long period of time. The effect of such beating is to untangle the threads and draw out the fibers without greatly reducing the fiber length. Thus the fibers are gently combed or brushed out without excessive cutting to yield a furnish in which a preponderance of the fibers have lengths between one quarter and three eighths of an inch. When such a properly prepared furnish is diluted with water, it will be observed that the fibers are individually dispersed in the aqueous medium and that no threads or clumps of fibers remain which would lead to unevenness in the finished sheet.

The second constituent of the felt is characterized by very short fiber length and an extremely low degree of hydration. Like the long-fibered constituent, it may be derived from any textile fiber such as cotton, wool, ramie, jute, etc., but wood pulp is not satisfactory for my needs because it lacks the strength essential to resist an objectional compaction of the sheet during its forming process or to provide in the finished sheet the desired firmness, resiliency, springiness, and life. Of the fibers which are suited to my purposes, I prefer cotton because it is cheap and slow to hydrate, and because, as the short fiber constituent, it imparts an extraordinarily high degree of springiness or life to the finished rubberized sheet. Short cotton fiber such as bleached cotton linters or such as is obtained from the dusters in cotton mills or as the screenings from rag cutters in paper mills is a convenient source of supply. It requires practically no beating and needs only to be subjected to a very fast cutting action in the beater for a very few minutes, or, in some cases, the beating may be dispensed with entirely. When a longer fiber is the source of material, however, comminution may be effected by an extremely fast beating tackle which serves to shorten the fibers with the production of minimum hydration.

After the two furnishes have been prepared, they are combined in any suitable mixing device such, for example, as a stock chest, and formed into a sheet according to any of the generally well known fiber assembly processes, as, for instance, by passing through a paper-making machine of either the single cylinder or the Fourdrinier type. The remarkably open-textured character of the wet sheet which forms on the wires of the paper-making machine permits the water to drain away, or to be expressed by the couch roll with surprising ease and rapidity; and this feature constitutes a special advantage of the present invention because it permits of a more rapid operation of the machine with its consequent economies than would otherwise be possible. Furthermore, in the manufacture of this felt I generally prefer to dispense with the press rolls, which are commonly employed to compact the sheet as it comes from the forming wires, because they tend to compact the mass and diminish the desirable absorptivity of the finished felt. The normal pressures of the couch roll and the felt commonly used on the drying cans are not objectionable, however.

It is obvious that the relative proportions of long and short fiber may be varied according to the particular qualities desired in the finished sheet; but I generally prefer to combine them in about equal proportions because this appears to convey a maximum of springiness or life to the rubber-permeated sheet. A reduction in the amount of long fiber within limits leads to an increase in absorptivity and a reduction in strength; or conversely, an increase in the amount of long fiber constituent within limits results in more strength and less absorptivity.

The following example shows in detail a manner in which an absorptive felt which is suitable for my purposes may be prepared. One thousand pounds of cotton shearings are placed in a paper beater with the necessary amount of water and subjected to a slow beating action for 8 to 10 hours, or until dilution of a sample of the slurry shows that no threads or clumps of fibers remain which would cause unevenness in the felted sheet. To this long-fibered furnish, contained in a stock chest, is then added a short-fibered furnish made by subjecting together with the requisite amount of water 1000 pounds of the screenings obtained from a rag cutter to a very fast cutting action for about 15 minutes. The mixed furnish is next formed into a sheet on an ordinary paper-making machine following the usual paper-making procedure with the single exception, as suggested above, that no press rolls are used and a low couch roll pressure is employed. The resulting dried sheet may then be impregnated with liquid rubber saturants according to any of the known methods; but I prefer to use for this purpose a latex composition and most of all a dormant coagulant composition such as described in my issued United States Patent No. 1,896,054, granted January 31, 1933.

As the mixture of the two types of furnishes which are employed in this invention passes through a fiber-assembling or paper-making machine, the long fibers serve to entwine and interlace the short fibers in a manner that leads to remarkable strength in both the wet and rubber-impregnated conditions. But the long fibers do more than convey strength to the sheet for they cooperate with the short-fiber constituent to afford a much higher absorptivity than would be possessed by a sheet made from either constituent alone. Furthermore, the interlacing and interlocking arrangement of the long and short fibers, when bonded by permeating rubber, results in a sheet which has more springiness, resiliency, or life than can be obtained in any other manner, so far as I am aware. The combination may be compared to a cushion comprised of large and small coiled springs, bound together by stay wires and interfilled with a soft resilient material like hair. The long fibers of my product correspond with the large stiff springs of the cushion, the short fibers with the smaller and weaker springs, the bonding property of my rubber constituent with the cushion stay wires, and the elastic property of the rubber with the resilient hair of the cushion.

The paper-maker's term "furnish" is used in this specification and the accompanying claims to mean any aqueous suspension of fibers which, alone or together with other similar material, is ready to be made into paper, as distinguished from a suspension of fibers or fibrous material which has not been suitably beaten or prepared for passage through a paper-making machine. And the term "felt" and its derivatives are employed in a broad general sense to denote the type of fiber arrangement which results when water is removed from a furnish, such as on a paper-making machine, to form a sheet.

It will be apparent to those skilled in the art that the usual procedures of adding compounding, filling, and pigmenting agents to liquid rubber saturants may be employed in conjunction with this invention and that the impregnated sheet may be vulcanized, calendered, and subjected to the usual forming and manipulative procedures commonly applied to material of this general type.

It should be understood that the present disclosure is for the purpose of illustration only, and that this invention includes all modifications and equivalents which fall within the scope of the appended claims.

I claim:

1. Process for the manufacture of rubber-impregnated fibrous sheet material which comprises combining a long beaten long-fibered furnish prepared from textile fibers with a short-fibered substantially unhydrated furnish separately prepared from textile fibers, forming the mixture into an absorptive sheet, and impregnating the sheet with a liquid rubber saturant.

2. Process for the manufacture of rubber-impregnated fibrous sheet material which comprises combining a long beaten long-fibered furnish prepared from textile fibers with a short-fibered substantially unhydrated furnish separately prepared from textile fibers, forming the mixture into an absorptive sheet, and impregnating the sheet with a latex composition.

3. Process for the manufacture of rubber-impregnated fibrous sheet material which comprises combining a long beaten long-fibered furnish prepared from cotton fibers with a short-fibered substantially unhydrated furnish separately prepared from cotton fibers, forming the mixture into an absorptive sheet, and impregnating the sheet with a liquid rubber saturant.

4. Process for the manufacture of rubber-impregnated fibrous sheet material which comprises combining a long beaten long-fibered furnish prepared from cotton fibers with a short-fibered substantially unhydrated furnish separately prepared from cotton fibers, forming the mixture into an absorptive sheet, and impregnating the sheet with a latex composition.

5. Process for the manufacture of rubber-impregnated fibrous sheet material which comprises combining a long beaten furnish the fibers of which consist essentially of textile fibers having lengths between one quarter and three eighths of an inch with a separately prepared short-fibered substantially unhydrated furnish prepared from textile fibers, forming the mixture into an absorptive sheet, and impregnating the sheet with a liquid rubber saturant.

6. As a new article of manufacture a rubber-permeated sheet which comprises in felted relationship with one another long beaten long textile fibers and short textile fibers of substantially unhydrated derivation.

7. As a new article of manufacture a latex-rubber permeated sheet which comprises in felted relationship with one another long beaten long textile fibers and short textile fibers of substantially unhydrated derivation.

8. As a new article of manufacture a rubber-permeated sheet which comprises in felted relationship with one another long beaten long cotton fibers and short cotton fibers of substantially unhydrated derivation.

9. As a new article of manufacture a latex-rubber permeated sheet which comprises in felted relationship with one another long beaten long cotton fibers and short cotton fibers of substantially unhydrated derivation.

10. As a new article of manufacture a latex-rubber permeated sheet which comprises in felted relationship with one another long beaten textile fibers between one quarter and three eighths of an inch long and short textile fibers of substantially unhydrated derivation.

11. As a new article of manufacture a latex-rubber permeated sheet which comprises in felted relationship with one another long beaten cotton fibers between one quarter and three eighths of an inch long and short cotton fibers of substantially unhydrated derivation.

12. A highly absorptive flexible water-laid felt comprising long fibers hydrated sufficiently to produce a self-sustaining web both in wet and dry condition and short substantially individualized unhydrated liberated fibers in amount to form an absorptive springy felt capable of receiving an impregnant.

13. A resilient, springy and flexible sheet formed from a water-laid felt comprising long fibers hydrated sufficiently to produce a self-sustaining web both in wet and dry condition and short substantially individualized unhydrated liberated fibers in amount to form an absorptive springy felt capable of receiving an impregnant, the whole being impregnated with a rubber saturant.

STEPHEN B. NEILEY.